United States Patent [19]
Burnett

[11] 3,893,545
[45] July 8, 1975

[54] MECHANICAL ACTUATOR FOR DISC BRAKE
[75] Inventor: Richard T. Burnett, South Bend, Ind.
[73] Assignee: The Bendix Corporation, South Bend, Ind.
[22] Filed: Oct. 25, 1973
[21] Appl. No.: 409,490

[52] U.S. Cl. ............... 188/72.6; 74/107; 188/72.7; 192/93 R
[51] Int. Cl. .......................................... F16d 55/26
[58] Field of Search ............ 188/72.7, 106 F, 72.6, 188/72.9; 74/107; 192/93 R, 93 A

[56] References Cited
UNITED STATES PATENTS
| | | | |
|---|---|---|---|
| 3,243,016 | 3/1966 | Swift | 188/72.6 X |
| 3,404,756 | 10/1968 | Swift | 188/72.6 X |
| 3,651,897 | 3/1972 | Hahn | 188/72.9 X |
| 3,701,400 | 10/1972 | Burnett et al. | 188/72.6 |

*Primary Examiner*—George E. A. Halvosa
*Attorney, Agent, or Firm*—Ken C. Decker; William N. Antonis

[57] ABSTRACT

A mechanical or parking actuator for a caliper disc brake is disclosed. The actuator includes a first socket mounted coaxially on a force transmitting member disposed within the caliper housing, a second socket pivotally mounted on the caliper housing for rotation about an axis offset from the axis of the force transmitting member and the first socket, and a force transmitting element or sphere disposed in the cavity defined by the first and second sockets. A lever is provided for rotating the second socket about the offset axis from a normal or neutral position wherein the second socket is aligned with the first socket and the force transmitting member to an applied position wherein the second socket is moved eccentric to the first socket, to thereby urge the force transmitting element to roll up the sides of the sockets, to thereby generate a force tending to separate the sockets. This separating force urges the force transmitting member, which is operably connected to the friction elements of the brake, in a direction which urges the friction element into frictional engagement with the brake rotor.

5 Claims, 1 Drawing Figure

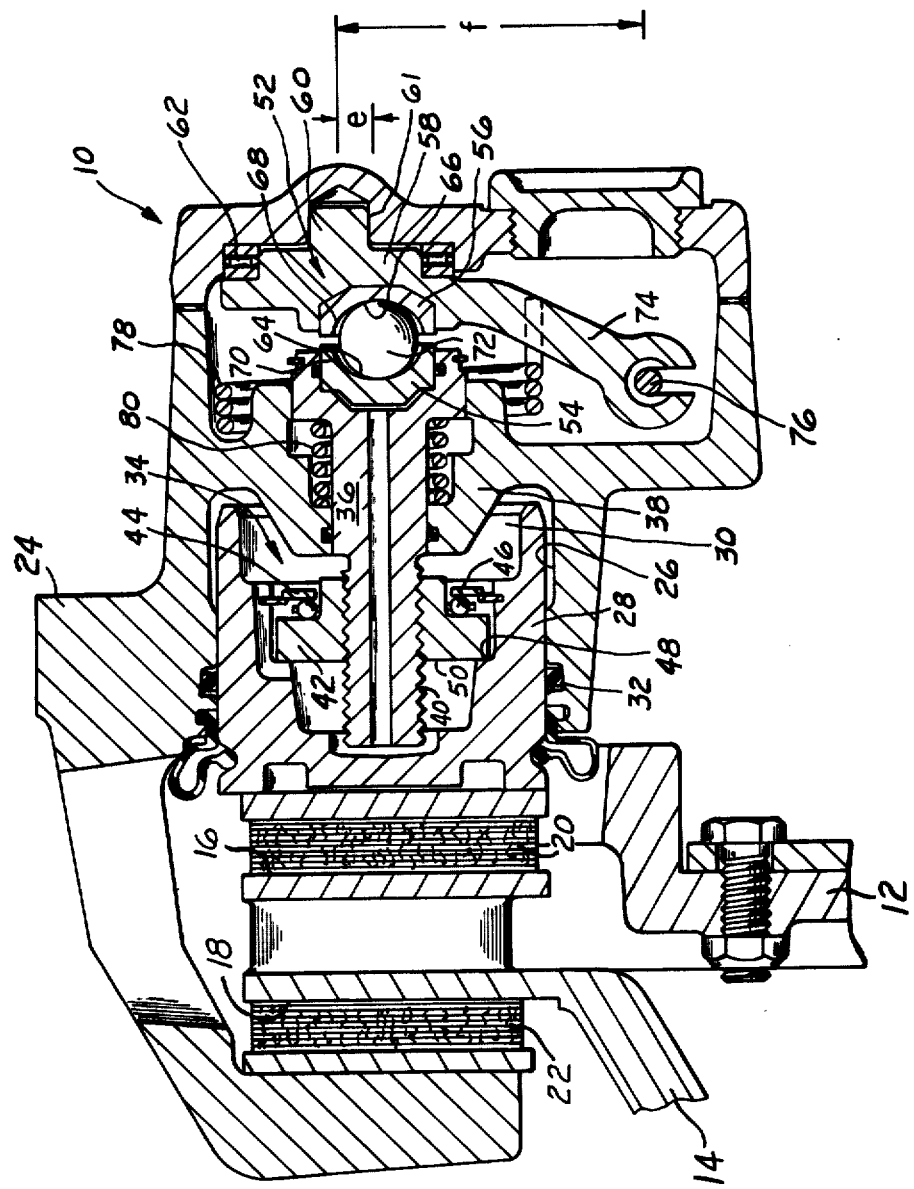

3,893,545

MECHANICAL ACTUATOR FOR DISC BRAKE

BACKGROUND OF THE INVENTION

This invention relates to a parking actuator, a mechanical actuator for a disc brake.

Although disc brakes have been used on the front wheels of automotive vehicles for a number of years, they have not been widely used on the rear wheels, partly because a suitable parking actuator has not been available. Such an actuator must be fairly simple, so that it may be manufactured and serviced at a minimum cost, but also must provide a relatively large mechanical advantage, so that the force required to apply the parking brake may be minimized. One example of a prior art disc brake parking actuator is the one disclosed in U.S. Pat. No. 3,701,400. This actuator uses three spheres which cooperate with mating recesses to apply the parking actuator. However, although this device works very well, it is fairly expensive to manufacture, since three spheres and their corresponding machined recesses must be provided. Another example of a prior art disc brake parking actuator is shown in U.S. Pat. No. 3,404,756. The brake disclosed in this patent is a single sphere and set of mating recesses, and also provides a lever which is pivoted off center from the axis of the recesses. The lever is provided with an aperture which fits between the recesses or sockets to embrace the sphere. However, the efficiency of this mechanism is low because the sphere must slide with respect to the mating recesses.

SUMMARY OF THE INVENTION

Therefore, an important object of my invention is to provide a mechanical or parking actuator for a disc brake which is more simple, and therefore less costly, than prior art disc brake actuators, but which also provides a very high mechanical advantage, so that minimum actuating forces are required.

Another important object of my invention is to provide a disc brake parking actuator which uses only a single force transmitting element or sphere and pair of mating recesses or sockets to actuate the brake, the sphere rolling with respect to the recesses to minimize frictional losses and achieve a high degree of efficiency.

Still another important object of my invention is to provide a mechanical or parking actuator for a disc brake, in which a pair of mating sockets or recesses cooperate with a force transmitting element to apply the brakes, one of the sockets being mounted for rotation about an axis offset from that of the sockets.

DESCRIPTION OF THE DRAWING

The sole FIGURE of the drawing is a transverse cross sectional view of a disc brake made pursuant to the teachings of my present invention.

DETAILED DESCRIPTION

Referring now to the drawing, a disc brake actuator generally indicated by the numeral 10 includes a torque member 12 which is mounted to a stationary or non-rotative portion of the vehicle, and a rotor 14 which is mounted for rotation with the vehicle wheel. The rotor 14 includes a pair of friction faces 16 and 18, and a pair of friction elements 20, 22 are disposed adjacent the friction faces 16 and 18, respectively. Of course, when a brake application is effected, either by the hydraulically actuated service actuator or the mechanical parking actuator, the friction elements 20 and 22 are urged into frictional engagement with their corresponding frictional faces 16 and 18 to thereby retard rotation of the rotor 14. A caliper housing 24 is slidably mounted on the torque member 12 for movement parallel to the axis of rotation of the rotor 14 and by any manner well known to those skilled in the art, such as the manner disclosed in my U.S. Pat. No. 3,388,774. The caliper housing 24 defines a bore 26 therewithin, which slidably mounts a hydraulic piston 28. Piston 28 cooperates with the wall of the bore 26 to define a fluid receiving cavity 30 therebetween, which is communicated to a suitable pressure source, such as the master cylinder of the vehicle (not shown). When a service brake actuation is effected, pressure is generated in the vehicle's master cylinder which is communicated into the cavity 30 by a passage (not shown), wherein it acts on the piston 28 to urge the latter to the left viewing the Figure, to thereby urge the friction element 20 into engagement with the friction face 16. Because of the slidable mounting of the caliper 24 on the torque member 12, the reaction forces acting through the caliper housing 24 will also urge friction element 22 into frictional engagement with the face 18 of the rotor 14. When the vehicle operator releases the brake, piston 28 is retracted a small amount by the retraction seal 32, which not only prevents fluid leakage from the cavity 30 along the interface between the piston 28 and the housing 24, but also urges the piston 28 to the right viewing the Figure, upon release of the brakes. The seal 32 is preferably made pursuant to the teachings of my U.S. Pat. No. 3,377,076. However, in order to limit retraction of the piston 28 to a predetermined amount, an automatic adjuster mechanism generally indicated by the numeral 34 is provided.

The adjuster mechanism 34 includes a force transmitting member 36 which is supported by a partition 38 in the bore 26 so that the force transmitting member 36 is coaxial with the piston 28 and is movable along the axis of the latter. Member 36 is provided with a threaded end 40 on which a nut 42 turns. The threads 40 are designed in such a way that if an axially directed force is applied to the nut 42 acting toward the rotor 14, nut 42 will turn on the force transmitting member 36 after the thread clearance has been taken up and will therefore advance toward the left-hand end of the latter. This type of threads is well known to those skilled in the art and will not be described in detail. This axially directed force is exerted on the nut 42 by a flat spring 44 which is carried by the piston 28 and which acts through an annular bearing 46 which permits the nut 42 to turn relative to spring 44. Therefore, when the piston 28 moves toward the friction face 16 in excess of some predetermined small amount, the spring 44 will exert an axially directed force through the bearing 46 on the nut 42, and the load at shoulder 48 will be relieved so that the nut can turn, thereby advancing the nut on the force transmitting member 36. since the piston 28 can retract only through the amount of the thread clearance, retraction of the piston will be limited to a predetermined amount. The main function of the adjuster is to minimize the movement required to actuate the parking brake.

Brake 10 further includes a mechanical or parking actuator generally indicated by the numeral 52. Actuator 52 includes a first socket 54 which is mounted on the member 36 coaxially with the latter, and a second socket 56 which is carried on a mounting member 58 which is provided with a projection 60 which is pivotally received within a bore 61 defined on the rear wall of the housing 24 so that the socket 56 is rotatable relative to the force transmitting member 36 and socket 54 about an axis offset from the axis of the force transmitting member 36 and socket 54 by a distance $e$. An annular thrust bearing 62 is provided between the mounting member 58 and the wall of the housing 24 so that the member 58, and thereby the socket 56, may be easily rotated relative to the housing 24. The sockets 54 and 56 are each provided with a hemispheroidal recess 64 and 66, whose walls are contoured as at 68 and 70, so that the recesses 64 and 66 do not conform to a true hemispheroidal shape. The wall contours at 68 and 70 are designed to produce a variable force ratio. However, the recesses 64 and 66 do cooperate with one another to define a substantially speroidal cavity therebetween which receives a spherical force transmitting element 72. The lever 74 extends from the mounting member 58 and the end of the lever 74 is shaped to receive the usual parking actuator cable generally indicated by the numeral 76. The length of the lever from its axis of rotation is designated $f$. Although the lever 74 is shown disposed within the housing 24, it obviously could be made to extend therefrom as is the usual case in parking actuators of this type. For example, the projection 60 might be made to extend through the wall of the housing 24 and the lever 74 be mounted directly on the projection 60 exteriorly of the housing. A torsion spring 78 is provided to exert a restoring rotative force on the lever 74, so that the latter, and therefore the mounting member 58, is urged back into the position illustrated in the drawing, wherein the recess 66 is aligned with the recess 64 and with that of the force transmitting element 36. The spring 80 yieldably urges the force transmitting element 36 to the right viewing the Figure so that the sockets 56 and 54 are urged together to retain the sphere 72 therebetween. The spring 80 is much stronger than is the resilient washer 44 so that, in the absence of a parking actuation, the adjuster mechanism 34 may operate without affecting the parking mechanism 52.

As is illustrated in the Figure, the offset $e$ between the axis of rotation of the lever 74 and the axis of the socket 66 is less than the sum of the radius of the force transmitting element 72 and the radius of the pin 60. Since the lever ratio is a function of the length of the lever divided by the offset between these axes, and since the length of the lever is constrained by other vehicle components in any given installation, it is desirable to minimize the offset to thereby maximize the lever ratio to minimize the activating forces required.

MODE OF OPERATION

The various components of the brake 10 are normally disposed in the position illustrated in the drawing when the brake is released. In this position, the recess 66 is aligned with the recess 64 and with the force transmitting element 36. When a parking brake application is effected, lever 74 is rotated, thereby rotating the mounting member 58 about the projection 60. However, since the axis of rotation of the mounting member 58 is offset from the force transmitting member 36 and the socket 54, the socket 56 will be brought out of alignment with the socket 64 as the lever is rotated. When this occurs, the sphere 72 will be urged up the camming surfaces 68 and 70, and will roll on both surfaces to thereby generate a force tending to separate the sockets 54 and 56. This separating force is transmitted by the force transmitting member 36 and the adjusting nut 42 to the piston 28, to thereby urge the latter to the left, viewing the Figure. When the piston moves to the left, the friction element 20 is urged into engagement with the friction face 16. Simultaneously, reaction forces acting through the caliper housing 24 will also urge friction elements 22 into braking engagement with the friction face 18. When the lever 74 is released, the spring 78 restores the lever 74, and thereby the socket 56, to the position illustrated in the drawing wherein the sockets are aligned. The spring 80 urges the force transmitting member 36, and therefore the socket 54, to the right viewing the Figure as the lever 74 is rotated back to its normal position illustrated in the drawing, thereby maintaining the sphere or force transmitting element 72 within the recesses 64 and 66, and thereby also urging the force transmitting member to the right viewing the Figure, away from the piston. When this occurs, the retracting force provided by the seal 32 also urges the piston to the right, to permit the friction elements 20 and 22 to move away from their corresponding friction faces 16 and 18.

Prior art disc brakes of this type generally provided a pair of substantially stationary sockets, with an eccentrically mounted lever having an aperture which embraced the force transmitting element directly at a point disposed between the sockets. The force transmitting elements, in these prior art actuators, therefore were used as a sort of "wedge" to force the sockets apart with sliding between the sockets and the force transmitting elements. In a disc brake, very high forces are required to apply the friction elements against the rotor and a high ratio force multiplying mechanism is needed. In the present invention, the mechanical ratio is the product of the lever length $f$ divided by the eccentricity $e$ and the cotangent of the ramp angle. Very high ratios have been achieved.

I claim:

1. In a brake:

a rotor having a pair of friction faces;

a pair of friction elements, one of said elements being disposed adjacent each of said friction faces;

a stationary torque member;

a caliper housing slidably mounted on said torque member and having portions disposed adjacent each of said friction elements for urging the latter into frictional engagement with the corresponding friction faces when a brake application is effected;

said caliper housing defining a bore therewithin, fluid pressure responsive means within said bore for effecting a service brake actuation, and mechanical actuating means for effecting a mechanical actuation of said brake;

said mechanical actuating means including a force transmitting member operably connected to one of said friction elements, a pair of mating recessed sockets, each of said sockets having an axis, said sockets carried on said force transmitting member and on said housing respectively, said sockets cooperating with each other to define a cavity therebetween, a substantially spherical force transmitting element disposed in the cavity defined by said sockets, one of said sockets being mounted coaxial with said force transmitting member, and pin means for mounting the other socket for rotative movement about an axis offset from the axis of the one socket, the offset between said axes being less than the sum of the radius of the spherical force transmitting element and the radius of said pin means, and lever means for rotating said other socket about said pin means from a neutral position wherein the other socket is aligned with the one socket to an actuated position wherein the other socket is displaced from the one socket, said force transmitting element being urged up the sides of said sockets upon rotation of said other socket to the actuated position to thereby generate a force tending to separate said sockets whereby forces are generated acting through said force transmitting member to effect a mechanical brake actuation.

2. The invention of claim 1:
said sockets defining generally hemispheroidal recesses therewithin, said cavity defined by said sockets being generally spheroidal, the walls of said cavity being contoured to define camming surfaces, said force transmitting element being forced up said camming surface when said other socket is rotated to the actuated position to generate said force tending to separate said sockets.

3. The invention of claim 1:
said sockets being substantially hemispheroidal recesses in said force transmitting member and in said mounting member, the walls of said recesses being contoured to define camming surfaces, so that as the other socket is rotated to bring the axis of the latter out of alignment with the axis of the one socket and the force transmitting member, said force transmitting element will be urged up said camming surfaces to exert a force on said sockets tending to separate the latter.

4. The invention of claim 1:
a thrust bearing mounting said mounting member on said housing for rotation with respect thereto.

5. The invention of claim 1:
said force transmitting element being supported solely by said sockets so that said force transmitting element is free to roll up the sides of said sockets upon movement of said other socket to the actuated position.

* * * * *